(12) United States Patent
Klockseth et al.

(10) Patent No.: US 6,997,206 B1
(45) Date of Patent: Feb. 14, 2006

(54) PRESSURE COMPENSATING VALVE

(76) Inventors: Martinus Oliver Klockseth, 90 Ashworth Avenue, Belrose (AU) 2085; Bengt Yngve Jervmo Roland, 40 James Sea Drive, Greenpoint (AU) 2251; Goran Bertil Claes Berndtsson, 1001 Avenida Pico PMB# 626, San Clemente, CA (US) 92673

( * ) Notice: Subject to any disclaimer, the term of this patent is extended or adjusted under 35 U.S.C. 154(b) by 0 days.

(21) Appl. No.: 09/367,666

(22) PCT Filed: Feb. 18, 1998

(86) PCT No.: PCT/AU98/00099

§ 371 (c)(1),
(2), (4) Date: Mar. 6, 2000

(87) PCT Pub. No.: WO98/36797

PCT Pub. Date: Aug. 27, 1998

(30) Foreign Application Priority Data

Feb. 18, 1997 (AU) .................................. PO5171

(51) Int. Cl.
F16K 7/18 (2006.01)
F16K 7/02 (2006.01)
A62B 9/02 (2006.01)
A62B 18/10 (2006.01)

(52) U.S. Cl. .............. 137/102; 137/512.15; 137/512.3; 137/908; 251/901; 128/205.24

(58) Field of Classification Search ................. 137/102, 137/508, 512.15, 512.4, 859, 908, 596.2; 251/901; 128/205.24

See application file for complete search history.

(56) References Cited

U.S. PATENT DOCUMENTS 1,618,671 A 2/1927 Pick (Continued)

FOREIGN PATENT DOCUMENTS

DE 32 29 608 A1 * 2/1984
SE 8602258-9 1/1988

(Continued)

OTHER PUBLICATIONS

Patent Abstracts of Japan, M-584, p. 7, JP 61-270567 A (Taiyo Sangyo KK), Nov. 29, 1986.

Primary Examiner—Ramesh Krishnamurthy
(74) Attorney, Agent, or Firm—Townsend and Townsend and Crew LLP

(57) ABSTRACT

This invention relates to a pressure compensating valve and more particularly, but not exclusively, to a balanced pressure compensating valve, or regulator. The valve includes a chamber (6) for containing fluid, defined by a flexible barrier (2) trapped between first (3) and second (4) surfaces. A fluid inlet provides fluid to the interior of the chamber. A fluid outlet selectively allows fluid to pass out of the chamber. Movement of the first (3) and second (4) surfaces relative to each other causes change in contact between the flexible barrier and the first and second surfaces to selectively open the fluid outlet, in a first position, and occlude it between the flexible barrier and one of the surfaces, in a second position.

10 Claims, 10 Drawing Sheets

U.S. PATENT DOCUMENTS 2,174,503 A 9/1939 Whipple
3,070,108 A * 12/1962 Fischer .................. 137/102
3,815,626 A 6/1974 Bryant
4,390,036 A * 6/1983 Athanassiu et al. ...... 137/116.5
4,428,392 A 1/1984 Jones
4,552,177 A 11/1985 Lapeyre
4,616,646 A * 10/1986 Beaussant .............. 128/205.24

FOREIGN PATENT DOCUMENTS

WO  WO 82/01924  6/1982

* cited by examiner

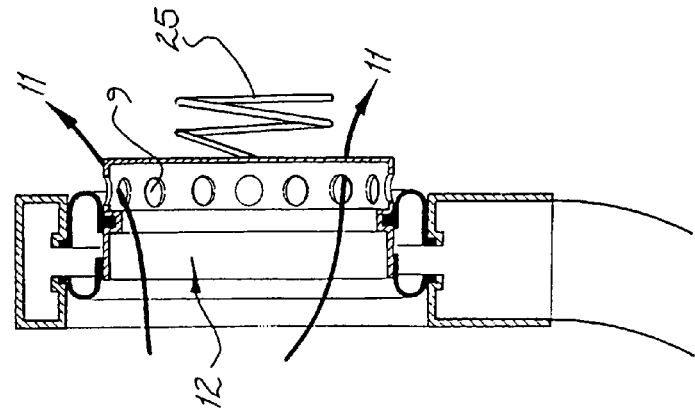
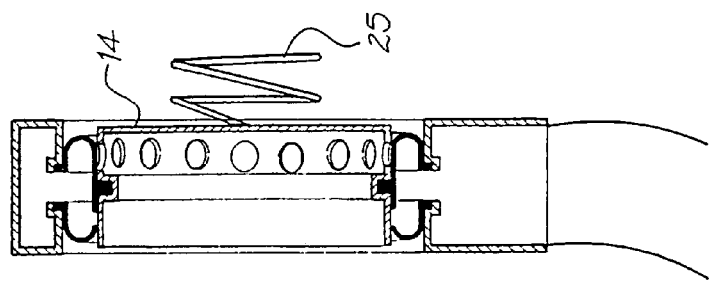
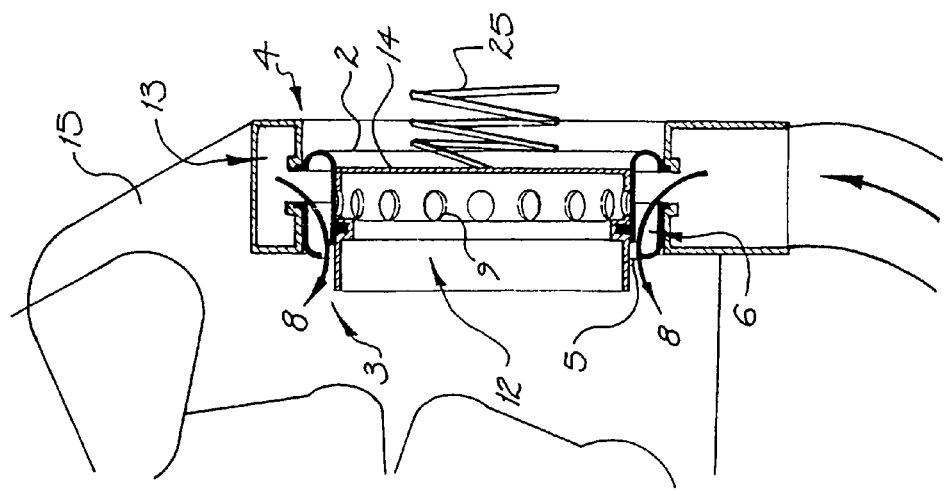

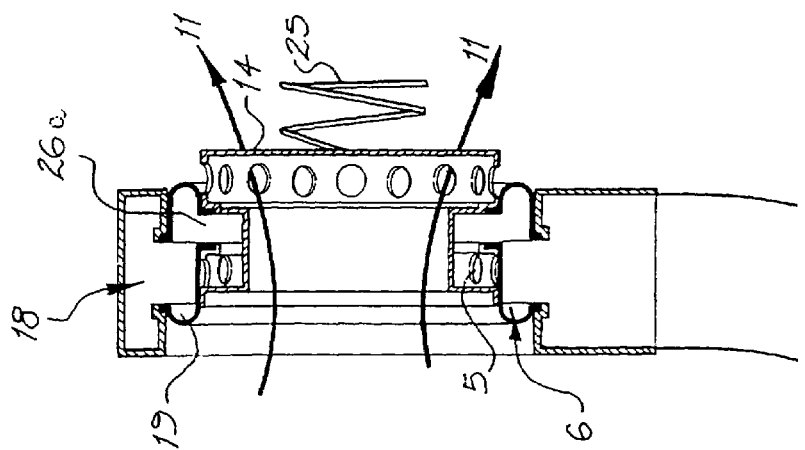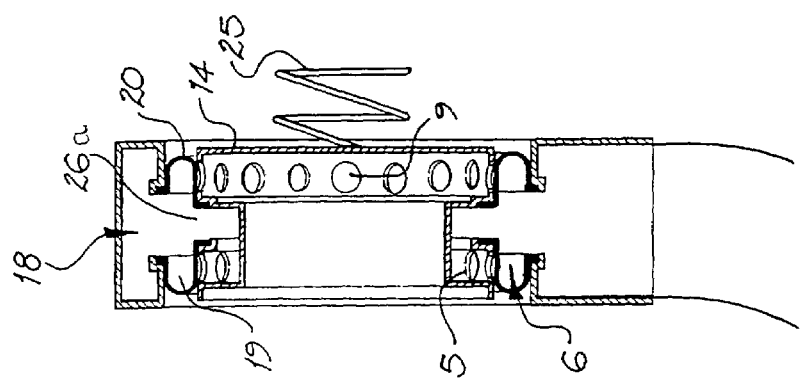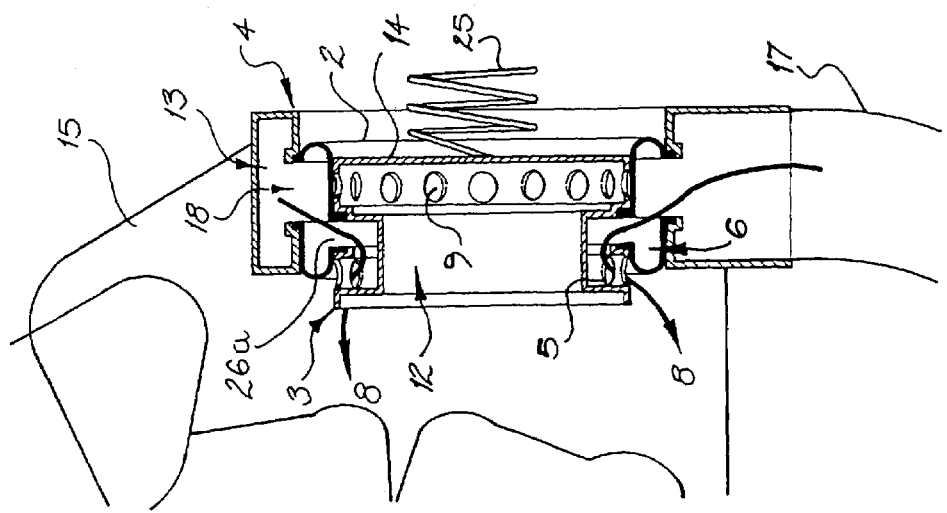

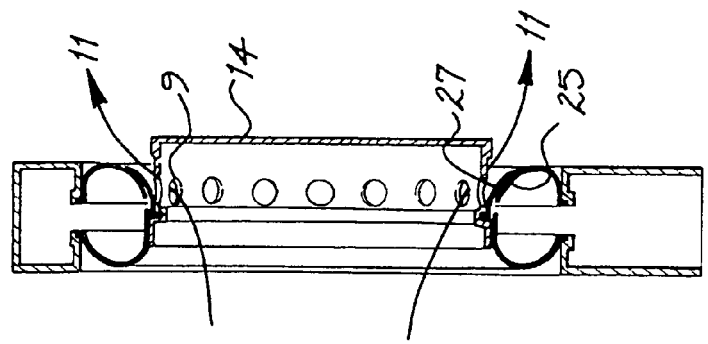
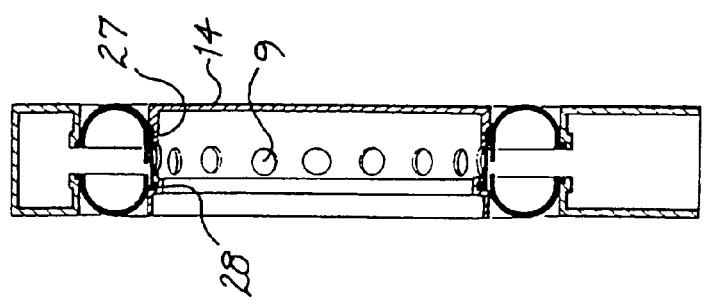
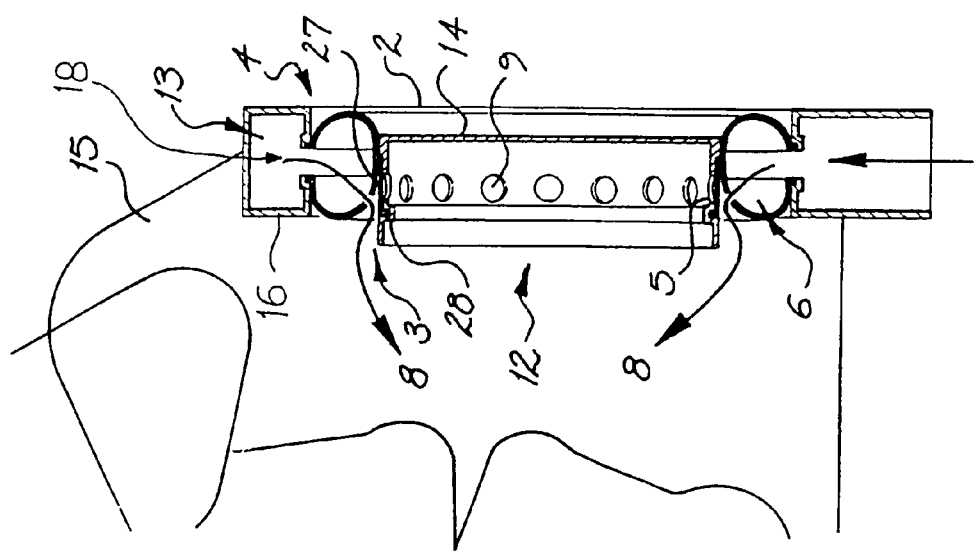

US 6,997,206 B1

PRESSURE COMPENSATING VALVE

FIELD OF THE INVENTION

The present invention relates to a pressure compensating valve and more particularly, but not exclusively, to a balanced pressure compensating valve, or regulator.

BACKGROUND ART

Pressure compensating valves are widely used in the supply of gases and liquids from a high pressure supply to a low pressure user. It is often desirable to maintain the low pressure side of the valve at a substantially constant pressure irrespective of pressure fluctuations on the high pressure side of the valve. Balanced pressure compensating valves are known for this purpose.

Existing balanced pressure compensating valves are relatively expensive, complex and difficult to manufacture and service. The present invention is directed to a pressure compensating valve which can, at least in preferred embodiments, be made in a very simple form at low cost and with good performance characteristics.

SUMMARY OF THE INVENTION

The invention is a pressure compensating valve including: A chamber for containing fluid, defined by a flexible barrier trapped between first and second surfaces. A fluid inlet to provide fluid to the interior of the chamber. And a fluid outlet to selectively allow fluid to pass out of the chamber. Movement of the first and second surfaces relative to each other causes change in contact between the flexible barrier and the first and second surfaces to selectively open the fluid outlet, in a first position, and occlude it between the flexible barrier and one of the surfaces, in a second position.

The flexible barrier may comprise of any one of a number of forms. In one arrangement the barrier may comprise a tube positioned between the first and second members and trapped by the friction between the barrier material and the surfaces.

The fluid inlet may pass through the first surface into the chamber. In this case the flexible barrier may be generally U-shaped in section with both ends connected to the first surface on either side of the fluid inlet.

The fluid outlet may include an aperture in the flexible barrier which is selectively occluded by one of the surfaces in the second position.

There may be a passage between the chamber and the second surface, in which case the fluid outlet may include an aperture in the second surface which is selectively occluded by the flexible barrier in the second position. In this arrangement the flexible barrier may comprise a pair of spaced apart membranes which extend between the surfaces, one on each side of the chamber. The membranes may be connected to the first surface on either side of the fluid inlet, and to the second surface on either side of the passage between the chamber and the second surface.

In its simplest form the valve may act as a one way pressure compensated valve controlling the inflow of high pressure fluid through the valve to a user, whether a human or a mechanical device.

The valve may further comprise an exhaust aperture in one of the first or second surfaces, which is selectively occluded by the flexible barrier in the first and second positions, but open in a third position. In the third position the fluid outlet is occluded. In this way the valve may control both the supply and exhaust of the fluid supply.

Whether the first and second surfaces are flat or curved, relative movement of the two surfaces parallel to each other may cause the flexible barrier to roll along the surfaces to selectively open the fluid outlet.

In an alternative the flexible barrier may have a flap-like extension which serves to open and occlude the fluid outlet.

The valve may further comprise a pressure plate connected to one of the first or second surfaces. In use, the pressure plate experiences a variable working pressure on an enclosed side, for instance inside a face mask, and a reference pressure on the other side. The pressure differential across the pressure plate causes movement of the first and second surfaces relative to each other to selectively supply fluid to the enclosed side.

The reference pressure may be atmospheric pressure or some other pressure. When the valve is used in breathing apparatus, other than diving apparatus, the reference pressure will conveniently be atmospheric. During exhalation, when the working pressure exceeds a predetermined relationship with atmospheric pressure, the pressure plate will be moved towards the reference pressure side of the valve causing the flexible barrier to be rolled over, and occlude, the outlet aperture. Conversely when the working pressure drops, during inhalation, the pressure plate will move in the opposite direction and the outlet aperture will be opened.

In some arrangements the area of the flexible barrier exposed to the working pressure and the reference pressure is equal so that any change in pressure in the fluid supply will not cause the second surface to be moved by differential force on opposed sides of the barrier. In other situations it may be desirable to deliberately utilise different exposed areas on each side of the barrier to bias the second surface towards a desired position.

The valve may further comprise a bias spring associated with the pressure plate to bias the first and second surfaces into predetermined position relative to each other. In particular the spring may serve to bias the second surface, relative to the first surface, with a defined force into an open position. In this arrangement the valve will be biased into an open position by the spring until the pressure in the mask exceeds that of the surrounding atmosphere by an amount that causes a force to be applied to the one side of the second member to move it, against the spring force, to the closed position.

The chamber may be toroidal, the first and second surfaces may be concentric cylinders, the fluid inlet may be an annular chamber formed on the outer surface of the outer cylinder, and the pressure plate may span the interior of the inner cylinder.

The first and second surfaces may be conveniently formed by injection moulding of a synthetic plastics material, and the flexible barrier may be formed of a suitably flexible rubber or synthetic plastics material. As the valve may be made from only few pieces, and from relatively cheap materials, it can be seen that it may offer significant manufacturing and cost advantages over known pressure compensating valves.

Valves according to the present invention are particularly useful in powered air purifying respirators. Such apparatus may be supplied by air pumped by means of a fan through a suitable filter. Alternatively the respirator may be of a self-contained type for use either underwater or where filtering of the ambient air is inappropriate.

When a pressure compensating valve according to the present invention is used in powered air purifying respirators it may control only the inhalation of air by the user or both inhalation and exhalation. In the former case the respirator will need to incorporate another exhaust valve of some sort.

BRIEF DESCRIPTION OF THE DRAWINGS

Several examples of the invention will now be described with reference to the accompanying drawings, in which:—

FIG. 4a is a vertical section through an alternative pressure compensating valve embodying the present invention in a first position; FIG. 4b shows a second position; and FIG. 4c shows a third position.

FIG. 5a is a vertical section through yet another pressure compensating valve embodying the present invention in a first position; FIG. 5b shows a second position; and FIG. 5c shows a third position.

FIG. 6a is a vertical section through yet another pressure compensation valve embodying the present invention in a first position; FIG. 6b shows a second position; and FIG. 6c shows a third position.

The same reference numerals have been used throughout the drawings to refer to corresponding features.

DETAILED DESCRIPTION OF THE INVENTION

Figure 1A:
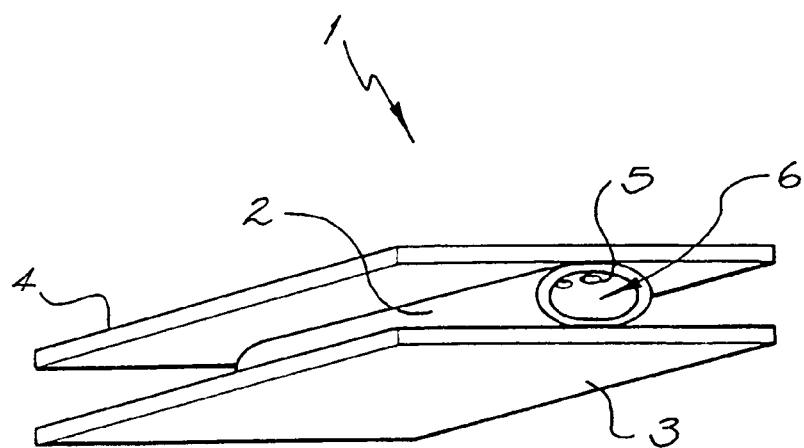
FIG. 1a is a schematic diagram illustrating a simple form of the invention in a first position.

FIG. 1a shows a pressure compensating valve 1 comprising a tube of flexible material 2 trapped between a first planar surface 3 and a second planar service 4.

A series of holes 5 extending along the upper side of the flexible tube 2 penetrate through its walls. The tube 2 itself defines a chamber 6 into which fluid is pumped, from a source which is not shown. In the position shown in FIG. 1a the fluid cannot escape from the chamber 6 but remains there at supply pressure.

Figure 1B:
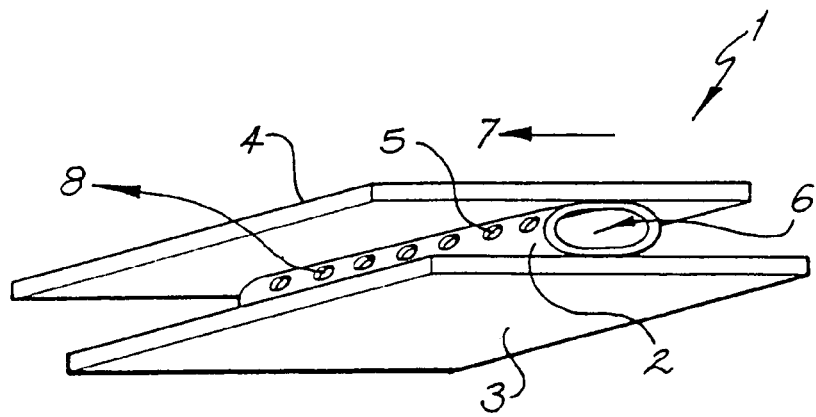
FIG. 1b is a schematic illustration of the second position.

When the upper planar surface 4 moves to the left with respect to the lower planar surface 3, as indicated by arrow 7 in FIG. 1b, the line of holes 5 are rotated anti-clockwise as friction between the tube 2 and the planar members causes it to roll between the planar surfaces. Once the holes clear the upper planar surface 4, fluid may flow through holes 5 from the relatively high pressure within chamber 6 to the relatively low pressure area indicated at the end of arrow 8.

If a reference pressure is provided to the right hand side of the valve arrangement, and a working pressure is applied to the left hand side of upper plate 4, then a reduction in the working pressure will cause the movement indicated by arrow 7 causing fluid to enter the chamber. Conversely, an increase in the working pressure will move planar surface 4 to the right and close the valve.

Figure 2A:
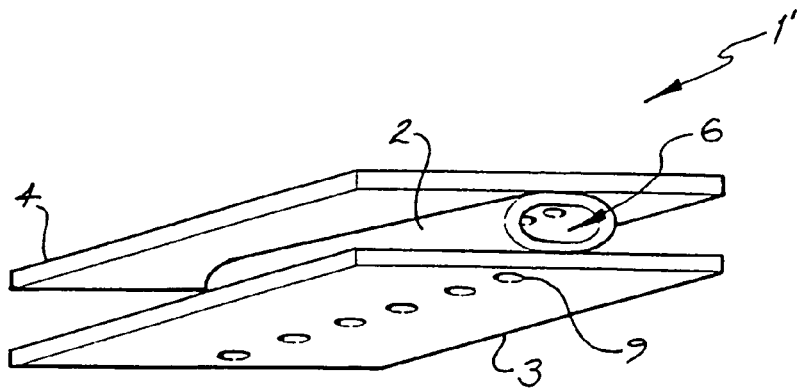
FIG. 2a is a schematic diagram of another simple form of the invention in a first position.
Figure 2B:
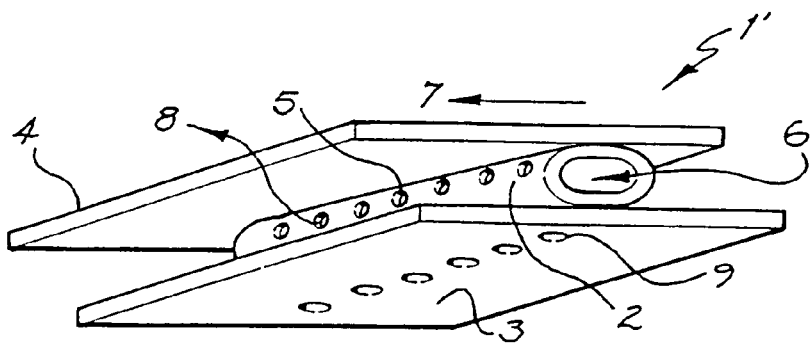
FIG. 2b is a schematic illustration of the second position.

In FIGS. 2a and 2b, a very similar valve 1' is shown. In this valve there are a second series of holes 9 extending through the lower plate 3 below the flexible barrier 2.

Figure 2C:
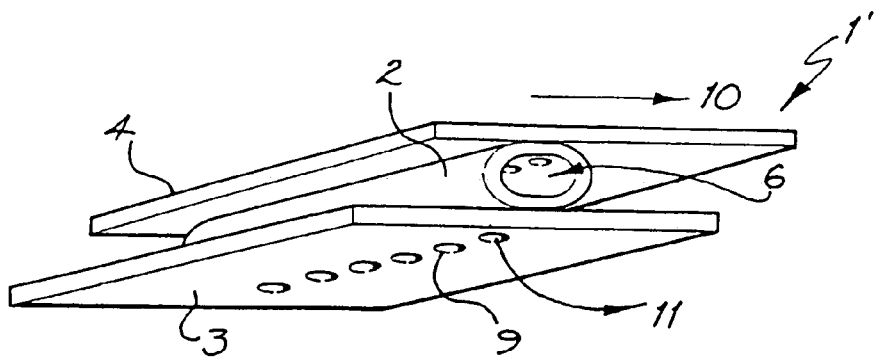
FIG. 2c is a schematic illustration of a third position.

In the first position shown in FIG. 2a, the supply fluid cannot escape tube 2. In the second position of FIG. 2b where the upper planar surface is moved to the left fluid is supplied through holes 5 to the left as indicated by arrow 8. In the third position of FIG. 2c, movement of the upper planar surface 4 to the right as indicated by arrow 10 closes holes 5 against upper planar surface 4, and maintains them closed as the plate 3 is moved sufficiently to open holes 9, allowing exhaust to flow back in the direction 11.

This valve therefore provides the ability not only to supply fluid, but also to exhaust spent fluid. When the valve is used in breathing apparatus an atmospheric reference pressure is applied to the right hand side of the valve, and a working pressure in a face mask acts on the left hand side of upper planar surface 4. The upper planar surface 4 will move to the left, as indicated by arrow 7 in FIG. 2b, when the working pressure falls during inhalation, and to the right, as indicated by arrow 10 in FIG. 2c, as the pressure rises during exhalation.

The apparatus shown in FIGS. 1 and 2 may be rolled up so that the tube 2 comprises a torus as shown in the remaining Figures. The lower planar surface 3 becomes the outer cylindrical wall of a movable valve member 12, and the upper planar surface 4 becomes the inner surface of an annular air supply duct 13. Depending upon the construction the inner, moveable, cylindrical member 12 is closed by an internal wall 14 which prevents fluid from passing through the member and provides a pressure plate. To the right of pressure plate 14 is atmospheric pressure, and to the left, which is inside the face mask 15, there is a variable working pressure.

Figure 3C:
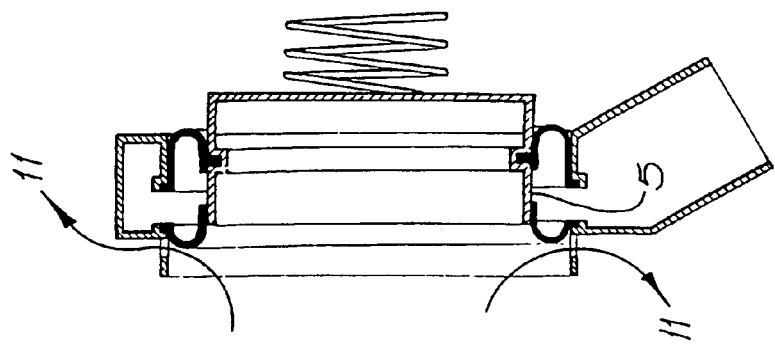
FIG. 3c shows a third position.
Figure 3B:
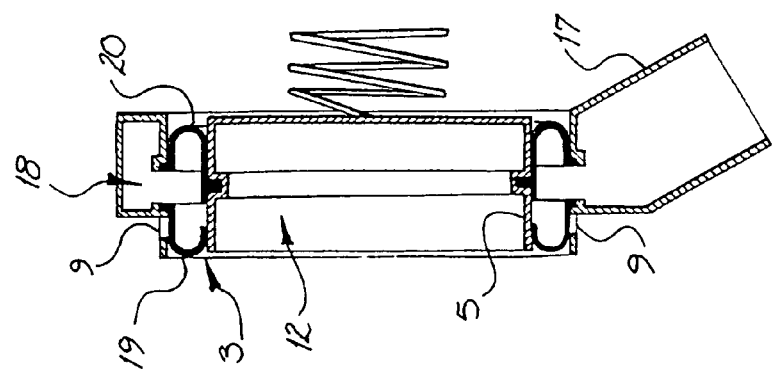
FIG. 3b shows a second position.
Figure 3A:
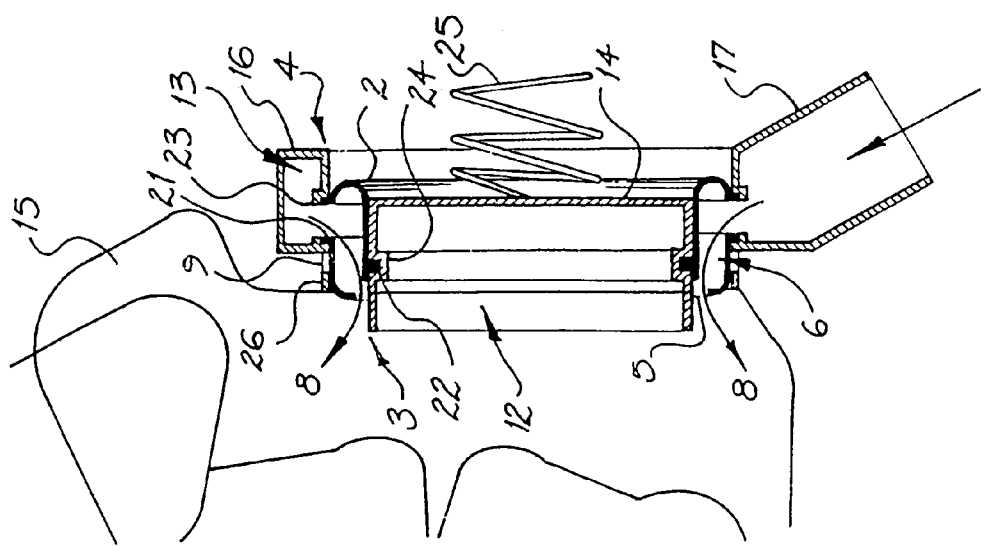
FIG. 3a is a vertical section through a pressure compensating valve embodying the invention in a first position.

Referring particularly to FIGS. 3a, 3b and 3c, the pressure compensating valve shown comprises an injection molded synthetic plastics housing 16 which defines annular duct 13. The movable member 12 is also formed of injection molded plastics material. The housing 16 includes a spigot 17 for connection to an air supply. Air entering through spigot 17 communicates with the annular duct 13 and via a slot 18 which extends around the full inside radius of housing 16, into chamber 6 bounded by the flexible barrier 2.

In this embodiment, the flexible barrier 2 comprises an inner flexible membrane 19 and an outer flexible membrane 20. Membrane 19 is connected along one end 21 to the left hand edge of slot 18, and along the other end 22 to the surface 3 of moveable member 12. And flexible membrane 20 is connected along one end 23 to the right hand edge of radial slot 18, and along the other end 24 to the surface 3 of inner member 12 adjacent the inner membrane 19. The membranes 19 and 20 are preformed with a U-shaped section and they are arranged so the arms of the 'U' lie against either the inner surface 4 of outer housing 16 or the outer surface 3 of inner member 12. A series of holes 5 penetrate the inner membrane 19 close to its end 22 adjacent the moveable member.

A bias spring 25 urges movable member 12 to the left so that the movable member is in a position shown in FIG. 3*a*. In this condition, air under substantially greater then atmospheric pressure is supplied through spigot 17 via annular duct 13 into the interior 6 of the chamber bounded by flexible membranes 19 and 20 and out through holes 5 into the breathing mask 15; as indicated by arrows 8. The flexible membrane 19 also occludes the series of holes 9 around the inner cylindrical extension 26 of outer member 16.

When the user stops inhaling, pressure within the mask 15 rises just sufficiently to balance the force of the spring 25, and valve member 12 moves to the position shown in FIG. 3*b*. In this condition the holes 5 in the inner membrane 19 are occluded by the exterior surface 3 of moveable member 12. The series of holes 9 around the inner cylindrical extension of outer member 16 also remain occluded by the other end of membrane 19.

As the user starts to exhale the pressure in face mask 15 rises and acts upon pressure plate 14 to drive movable member 12 further to the right, as indicated in FIG. 3*c*. As this happens flexible membrane 19 moves away from the series of holes 9 to enable the exhalation to exhaust to atmosphere, as indicated by arrows 11.

The arrangement shown in FIG. 4 operates in essentially the same way as that shown in FIG. 3, however, in this case the exhaust apertures 9, instead of being placed around the circumference of the outer member 16 are placed around the outer circumference of the right hand end of movable member 12, that is in the right hand side of surface 3. In the first and second positions shown in FIGS. 4*a* and 4*b* the exhaust holes 9 are occluded by the flexible membrane 20. However, in the third position shown in FIG. 4*c* the movable member 12 is moved sufficiently far to the right that flexible membrane 20 has drawn away from holes 9 and opens the exhaust path 11.

In FIG. 5 operation is a little more complicated by the inclusion of a passageway 26 extending from the interior of chamber 6 into the interior of member 12. In this case, inlet holes 5 are provided around the left hand end of the outer cylindrical housing 3 of movable member 12. In other words, in the left hand side of surface 3. As shown in FIG. 4, the exhaust openings are in the right hand side of surface 3.

In the first position, shown in FIG. 5*a*, air flows through spigot 17 into the annular space 13, through slot 18 into chamber 6, then through passageway 26*a* into the interior of member 12 and out through holes 5 into mask 15 as indicated by arrows 8. The holes 5 are occluded by the inner membrane 19 in the second position shown in FIG. 5*b*, and they remain occluded in the third position shown in FIG. 5*c*. However, the exhaust openings 9, which are occluded by flexible member 20 in the first and second position shown in FIGS. 5*a* and 5*b*, are open in the third position shown in FIG. 5*c*.

In FIG. 6, the tubular barrier 2 is formed of a single membrane attached at both its ends to either side of slot 18 in the outer member 16.

An extension flap 27 extends radially inward from tubular barrier 2, and lies along the outer surface 3 of inner member 12. The distal end of flap 27 is attached into a groove 28 which extends around the circumference of surface 3.

A series of openings 5 extend around the inner side of membrane 2 between the point of connection of flap 27 and the connection to the left hand edge of slot 18. Inhalation operates in the same fashion as in FIGS. 3*a* and 4*a*, with the exhaust apertures 9 being closed by flap 27 which overlies them. As the inner member 12 moves to the right, to the second position shown in FIG. 6*b* flap 23 stills overlies holes 9, but as the inner member 12 continues to move to the right, flap 23 is drawn away from apertures 9 as its point of attachment 28 to member 2 is drawn away from surface 3, to allow exhaust along path 11.

FIG. 7 shows an alternative arrangement in which the inlet path is similar to that as shown in FIG. 5, but an additional exhaust valve 29 is provided inside face mask 15. The exhaust valve 29 comprises a flexible circular diaphragm 30 connected at its periphery to an inner cylindrical extension 31 of housing 16.

Radially inwards of its connection to housing 16 the diaphragm 30, when in the relaxed condition, abuts against a circular shoulder 32 on the housing 16. An inlet flap valve 33 is provided in diaphragm 30 within the area bounded by shoulder 32.

Figure 7A:
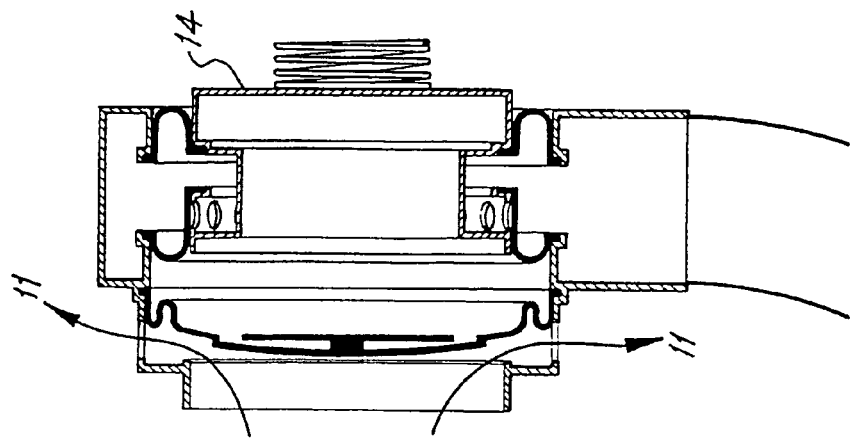
FIG. 7a is a vertical section through a pressure compensating valve embodying the present invention in combination with a separate exhaust valve, in a first position.

In use, air under substantially greater then atmospheric pressure is supplied through spigot 17 into the duct 13. This air will initially find the valve in the condition as shown in FIG. 7*a* due to the force of bias spring 25 which urges movable member 12 to the left. In this position air flows through the inlet ports 5 in the left hand end of the outer circumference of movable member 12 and through holes in diaphragm 27 underneath flap valve 29 into space bounded by mask 15.

Figure 7B:
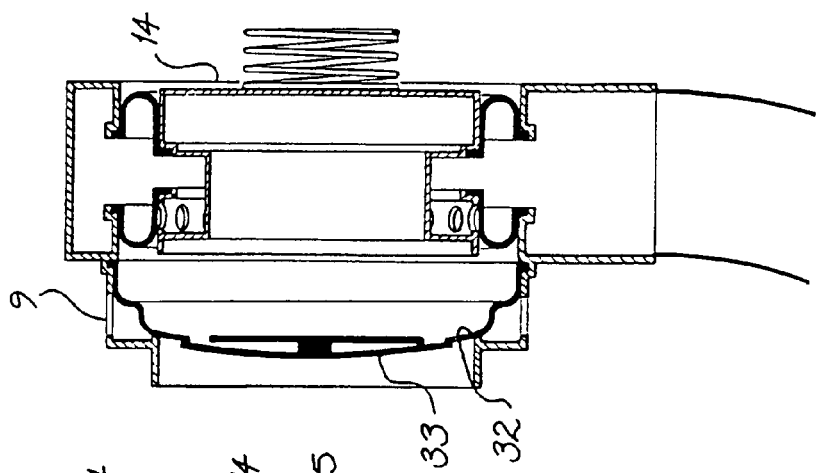
FIG. 7b shows a second position.

When the user stops inhaling, pressure builds inside mask 15, and when it rises just sufficiently to balance the force of spring 25, the movable valve member 12 moves to the condition shown in FIG. 7*b* and flap valve 33 closes.

Figure 7C:
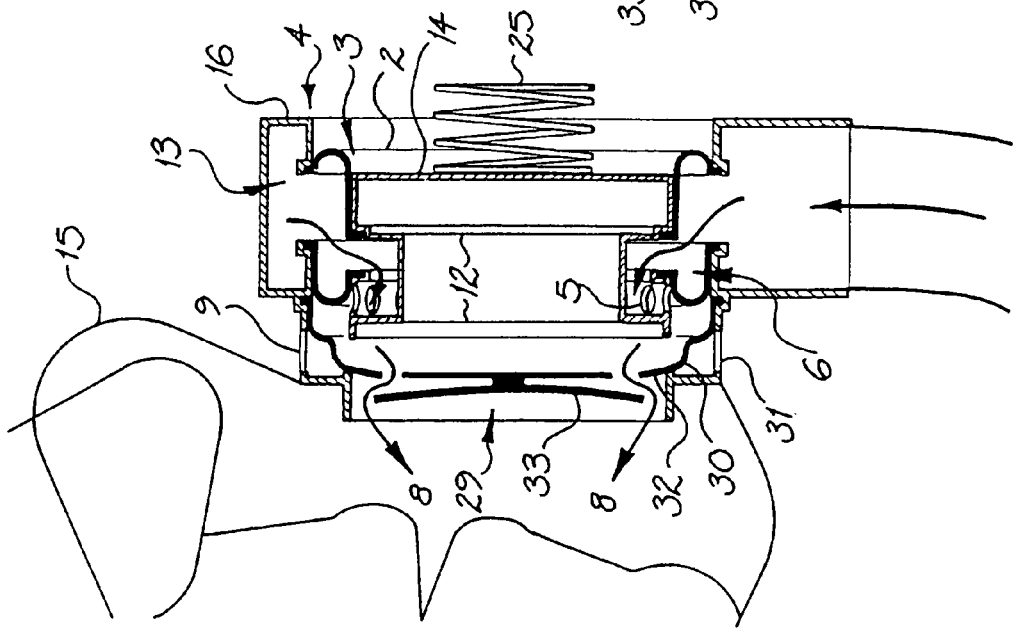
FIG. 7c shows a third position.

As the user starts to exhale, the pressure inside the mask increases, and causes diaphragm 30 to move to the right away from shoulder 32. Air can then flow past shoulder 32 and exhaust through the exhaust ports 9, as shown in FIG. 7*c* by the arrows 11.

Figure 8:
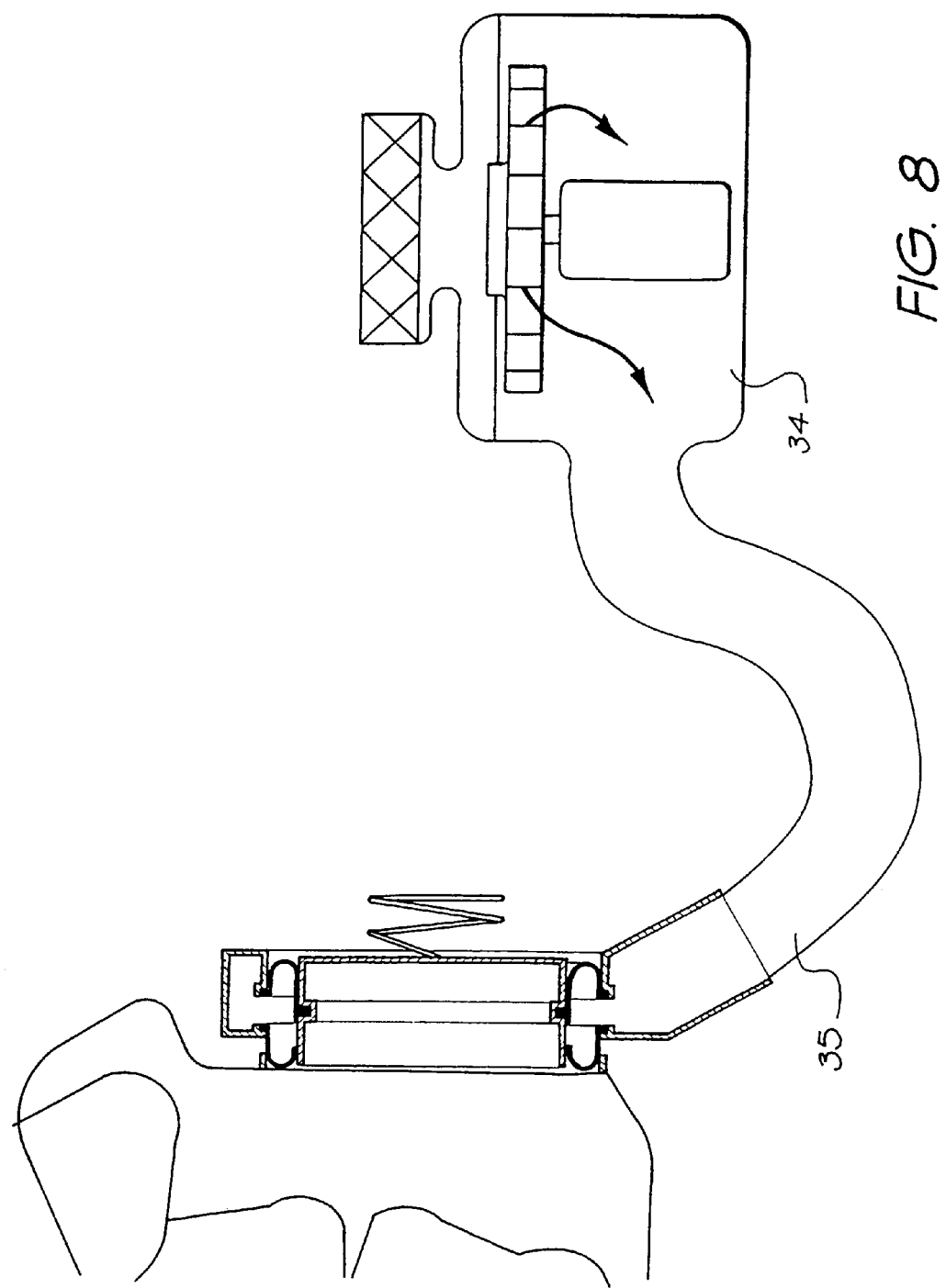
FIG. 8 is a vertical section through a fan driven powered air purifying respirator incorporating the pressure compensating valve of FIG. 3.

The pressure compensating valve may be connected to a fan driven air blower 34 in a fan forced positive air pressure breathing apparatus, as shown in FIG. 8. The fan communicates with the valve through a wide diameter hose 35.

Figure 9:
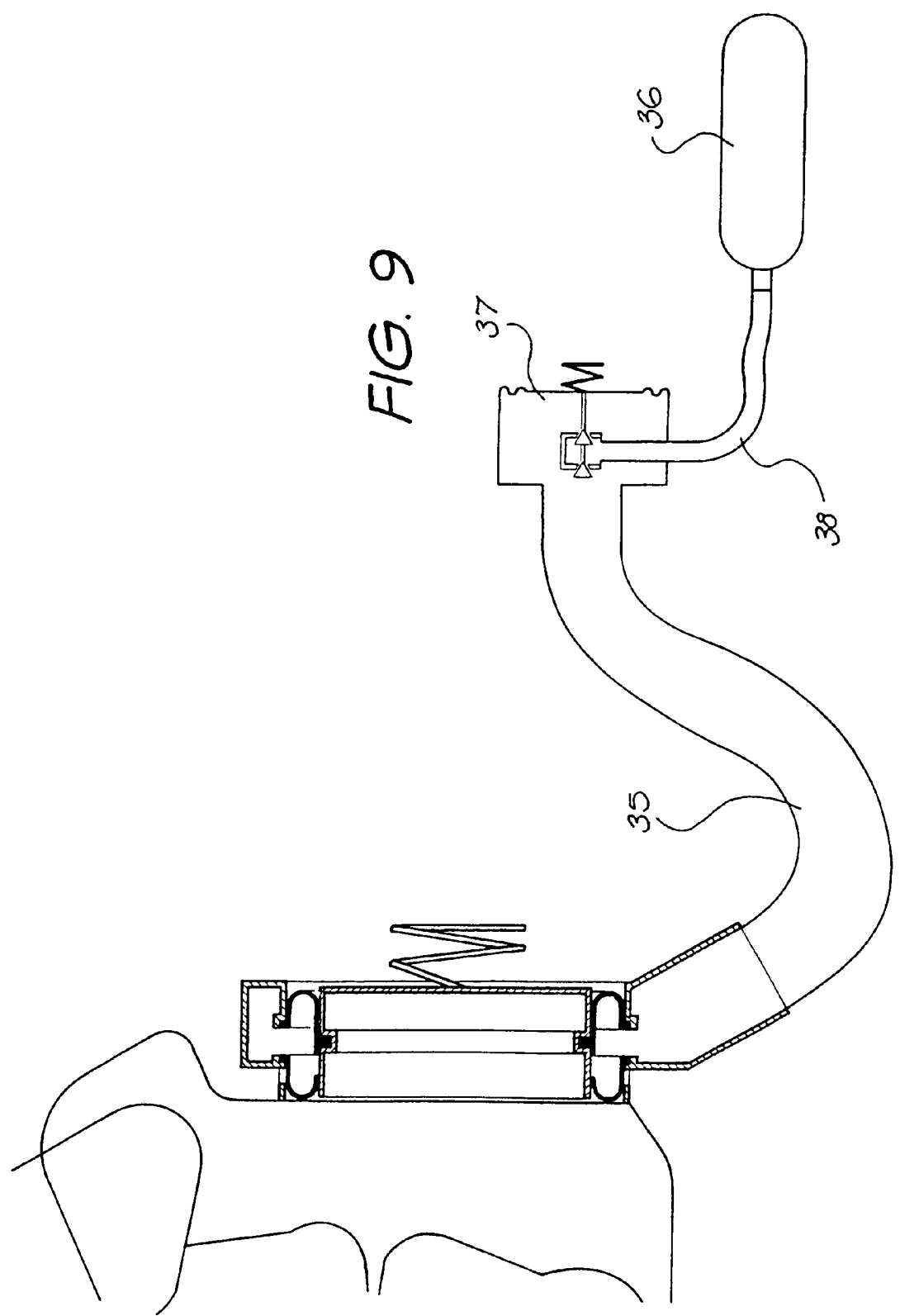
FIG. 9 is a vertical section through a breathing apparatus style respirator supplied with high pressure air and incorporating a conventional regulator and the pressure compensating valve of FIG. 3.
Figure 10:
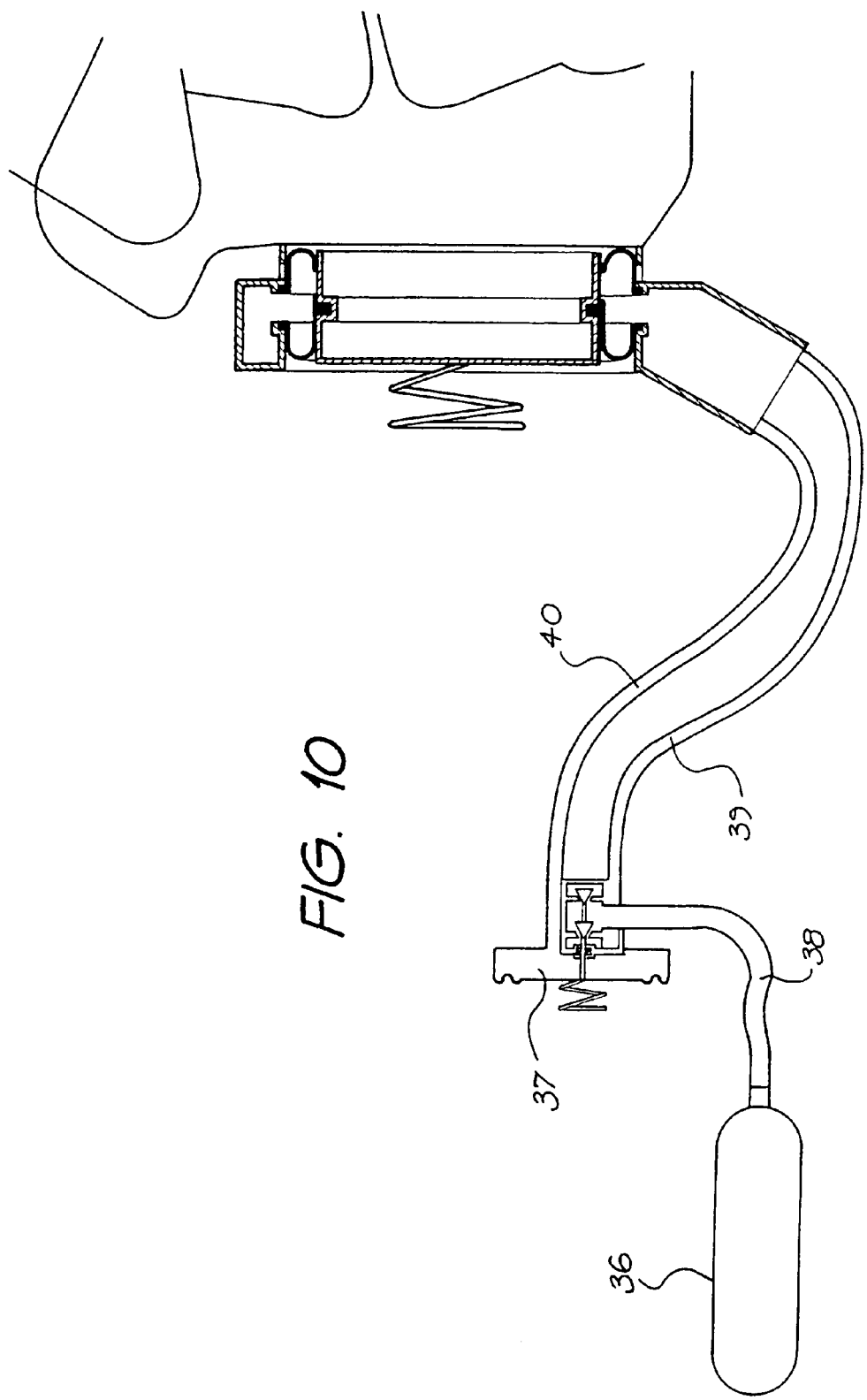
FIG. 10 is a vertical section through a breathing appartaus style respirator supplied with high pressure air and incorporating a different regulator and the pressure compensating valve of FIG. 3.

The pressure compensating valve may alternatively be connected to an air supply such as a compressed air cylinder 36 like a self-contained breathing apparatus, or alternativenly to an industrial pressurised air supply through a regulator 37, as shown in FIG. 9. In this case a narrow diameter high pressure hose 38 connects the air cylinder to the regulator. The regulator is, in turn, connected to valve through a wide diameter hose 35 as before.

The pressure compensating valve may also be connected to an air supply such as a compressed air cylinder 36 through a regulator 37 in a self-contained breathing apparatus. In this case two narrow diameter hoses 39 and 40 and connect the regulator with the valve. One of the hoses acts as a pilot hose conveying to the regulator the pressure on the inlet side of valve.

It should be appreciated that the pressure compensating valve may be embodied in many other ways besides those described above. For instance, although all the embodiments show a valve having a generally circular configuration it could work equally well with other configurations such as oval or even square. Where a circular configuration is employed the surfaces need not be cylindrical but could be conical. Alternatively, a linear configuration could be envisaged where the flexible barrier is straight and has a connection at either end to a hinge that lies parallel to its axis. Depending on the configuration the flexible barrier may roll, stretch or deform as the two surfaces move relative to each other to open and occlude the fluid outlet.

It will be appreciated by persons skilled in the art that numerous variations and/or modifications may be made to the invention as shown in the specific embodiments without departing from the spirit or scope of the invention as broadly described. The present embodiments are, therefore, to be considered in all respects as illustrative and not restrictive.

The invention claimed is:

1. A pressure compensating valve including:
   a chamber for containing fluid defined by a flexible barrier trapped between first and second surfaces;
   a fluid inlet to provide fluid to the interior of the chamber; and
   a fluid outlet to selectively allow fluid to pass out of the chamber;
   wherein, movement of the first and second surfaces relative to each other causes change in contact between the flexible barrier and the first and second surfaces to selectively open the fluid outlet, in a first position, and occlude it between the flexible barrier and one of the surfaces, in a second position; and wherein the fluid outlet includes an aperture in the flexible barrier which is selectively occluded by one of the surfaces, in the second position.

2. A pressure compensating valve according to claim 1, wherein the fluid inlet passes through the first surface into the chamber.

3. A pressure compensating valve according to claim 1, further comprising an exhaust aperture in one of the first or second surfaces which is selectively occluded by the flexible barrier in the first and second positions, but open in a third position in which the fluid outlet is occluded.

4. A pressure compensating valve according to claim 1, wherein relative movement of the first and second surfaces parallel to each other causes the flexible barrier to roll along the surfaces to selectively open the fluid outlet.

5. A pressure compensating valve according to claim 1, wherein a flap-like extension of the flexible barrier selectively opens and occludes the fluid outlet.

6. A pressure compensating valve according to claim 1, further comprising a pressure plate connected to one of the first or second surfaces wherein, in use, the pressure plate experiences a variable working pressure on an enclosed side and a reference pressure on the other side; the pressure differential across the pressure plate causing movement of the first and second surfaces relative to each other to selectively supply fluid to the enclosed side.

7. A pressure compensating valve according to claim 6, further comprising a bias spring associated with the pressure plate to bias the first and second surfaces into predetermined positions relative to each other.

8. A pressure compensating valve according to claim 6, wherein the chamber is toroidal, the first and second surfaces are concentric cylinders, the fluid inlet is an annular chamber formed on the outer surface of the outer cylinder, and the pressure plate spans the interior of the inner cylinder.

9. A pressure compensating valve including:
   a chamber for containing fluid defined by a flexible barrier trapped between first and second surfaces;
   a fluid inlet to provide fluid to the interior of the chamber;
   a fluid outlet to selectively allow fluid to pass out of the chamber; and
   an exhaust aperture in one of the first or second surfaces which is selectively occluded by the flexible barrier in the first and second positions, but open in a third position in which the fluid outlet is occluded;
   wherein, movement of the first and second surfaces relative to each other causes change in contact between the flexible barrier and the first and second surfaces to selectively open the fluid outlet, in a first position, and occlude it between the flexible barrier and one of the surfaces, in a second position.

10. A pressure compensating valve according to claim 9, wherein there is a passage between the chamber and the second surface, and the fluid outlet includes an aperture in the second surface which is selectively occluded by the flexible barrier, in the second position.

* * * * *